(12) United States Patent
Obuchi et al.

(10) Patent No.: US 7,685,504 B2
(45) Date of Patent: Mar. 23, 2010

(54) METHOD AND APPARATUS FOR CONTROLLING TRANSMITTING, RECEIVING, AND RE-TRANSMISSION

(75) Inventors: Kazuhisa Obuchi, Yokohama (JP); Tetsuya Yano, Yokosuka (JP); Shunji Miyazaki, Yokosuka (JP)

(73) Assignee: Fujitsu Limited, Kawasaki (JP)

( * ) Notice: Subject to any disclaimer, the term of this patent is extended or adjusted under 35 U.S.C. 154(b) by 853 days.

(21) Appl. No.: 10/963,811

(22) Filed: Oct. 14, 2004

(65) Prior Publication Data
US 2005/0193310 A1  Sep. 1, 2005

(30) Foreign Application Priority Data
Feb. 27, 2004  (JP)  ............... 2004-052628

(51) Int. Cl.
*H03M 13/03*  (2006.01)
(52) U.S. Cl. ...................... 714/790; 714/749
(58) Field of Classification Search .......... 714/774, 714/749, 790
See application file for complete search history.

(56) References Cited

U.S. PATENT DOCUMENTS

| | | | |
|---|---|---|---|
| 6,697,988 B2 * | 2/2004 | Kim et al. | 714/752 |
| 7,000,173 B2 * | 2/2006 | Buckley et al. | 714/790 |
| 7,146,552 B2 * | 12/2006 | Kim et al. | 714/755 |
| 2002/0004924 A1 * | 1/2002 | Kim et al. | 714/752 |
| 2002/0009157 A1 | 1/2002 | Sipola | |
| 2002/0071407 A1 * | 6/2002 | Koo et al. | 370/335 |
| 2003/0133497 A1 * | 7/2003 | Kinjo et al. | 375/152 |
| 2003/0159100 A1 * | 8/2003 | Buckley et al. | 714/758 |

FOREIGN PATENT DOCUMENTS

JP  2003-509956  3/2003

OTHER PUBLICATIONS

Patent Abstract of Japan 2001-119426, Apr. 27, 2001.
Japanese Office Action dated Jun. 23, 2009 of corresponding Japanese Patent Application No. 2004-052628.

* cited by examiner

*Primary Examiner*—M. Mujtaba K Chaudry
(74) *Attorney, Agent, or Firm*—Hanify & King, P.C.

(57) ABSTRACT

A method and apparatus operable to execute an error correction decoding process, while controlling the increase in the amount of data that is stored in the receiving apparatus, is disclosed. Data is preferably transmitted to a receiving apparatus to execute the error correction decoding process using received data and re-transmitted data. Transmitting data is generated by executing the rate matching process to a first part of the error correction coded data and generating a second transmitting data. The second transmitting data includes at least the data not included in the first part by executing the rate matching process. Also included is a transmitting means for executing the transmission of the second transmitting data as the re-transmission after the transmission of the first transmitting data.

5 Claims, 7 Drawing Sheets

PRIOR ART

FIG. 3

PRIOR ART

METHOD AND APPARATUS FOR CONTROLLING TRANSMITTING, RECEIVING, AND RE-TRANSMISSION

FIELD OF THE INVENTION

The present invention relates to a transmitting apparatus, a receiving apparatus, and a re-transmission control method. More specifically, the present invention relates to a radio base station and a mobile station in a mobile radio communication system.

BACKGROUND OF THE INVENTION

Standardization of the W-CDMA (UMTS) system, which is one of the third generation mobile communication system, is now under development by the 3GPP ($3^{rd}$ Generation Partnership Project). As a theme of standardization, the HSDPA (High Speed Downlink Packet Access) which can provide a maximum transmission velocity of about 14 Mbps for the downlink is specified.

The HSDPA employs an adaptive modulation and coding (AMC) system which includes, for example, a QPSK modulation method and a 16-level QAM method that are switched adaptively in accordance with the radio communication environment between the base station and mobile station.

Moreover, the HSDPA also adopts the H-ARQ (Hybrid Automatic Repeat request) system. When a mobile station has detected an error in the receiving data received from the base station, the data is re-transmitted from the base station responding to the request from the mobile station, while the mobile station executes the error correction decoding process using both received data and the data received from the re-transmission. In the H-ARQ, as described above, if an error is detected, the gain of the error correction decoding is raised and the number of times of re-transmission is controlled by effectively utilizing the received data.

The major radio channels used for the HSDPA include the HS-SCCH (High Speed-Shared Control Channel), HS-PDSCH (High Speed-Physical Downlink Shared Channel), and HS-DPCCH (High Speed-Dedicated Physical Control Channel).

The HS-SCCH and the HS-PDSCH are shared channels in the downlink direction (i.e., the direction toward a mobile station from a base station), and the HS-SCCH is a control channel for sending various parameters of data transmitted by the HS-PDSCH. The parameters, such as the modulation information which indicates the modulation method used for transmission by the HS-PDSCH, number of spreading codes assigned (number of codes), and information such as the pattern of the rate matching for the transmitting data may all be considered.

Meanwhile, the HS-DPCCH is an dedicated control channel in the uplink direction (i.e., the direction toward a base station from a mobile station) and is used to transmit the ACK signal and NACK signal to the base station from the mobile station in accordance with the acknowledgment or non-acknowledgment of reception of the data received via the HS-PDSCH. If a mobile station has failed to receive the data (the CRC error is detected in the receiving data or the like), the base station executes the re-transmission control because the NACK signal is transmitted from the mobile station or neither the ACK signal nor the NACK signal is received by the base station.

Moreover, the HS-DPCCH may also be used by the mobile station which measured the receiving quality of the signal received from the base station to transmit the result of the measurement to the base station as the CQI (Channel Quality Indicator). The base station determines the environment of the radio communication on the basis of the received CQI. When the communication environment is good, the modulation method is switched to the method for transmitting the data at the higher transmission rate. If the environment is not as good, on the contrary, the modulation method is switched to the method for transmitting the data at a lower transmission rate (namely, adaptive modulation is executed).

"Channel Format"

Next, a channel format in the HSDPA will be described below.

Figure 1:
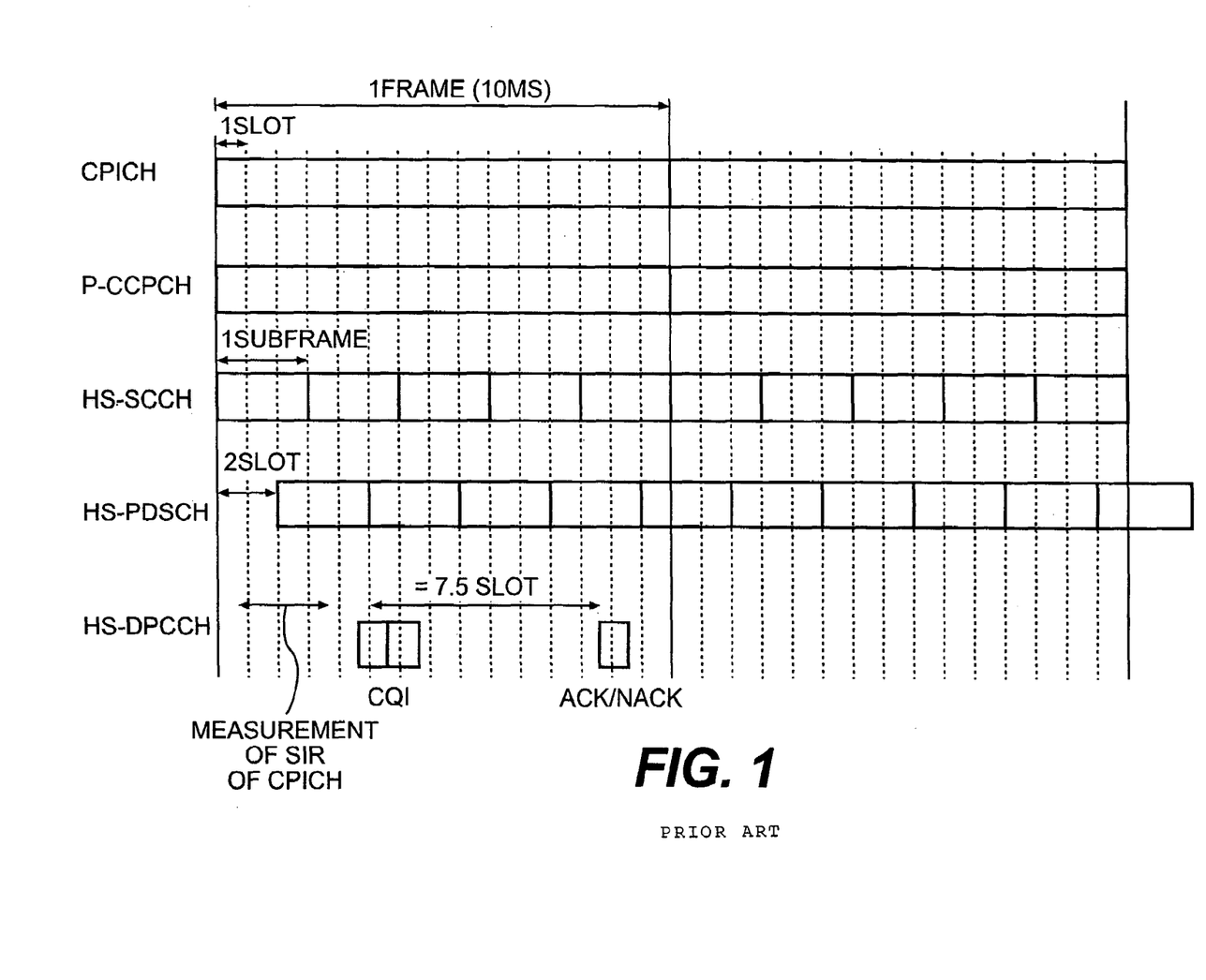
FIG. 1 is a diagram illustrating one embodiment of a channel format of the HSDPA channel.

FIG. 1 is a diagram illustrating a channel format in the HSDPA. The W-CDMA introduces the code dividing multiplex system and each channel is therefore separated with the spreading code.

The channels not yet described will be described briefly first.

CPICH (Common Pilot Channel) and P-CCPCH (Primary Common Control Physical Channel) are respectively common channels in the downlink direction.

The CPICH is a channel used by a mobile station for estimation of channel condition, searching of cells, the timing reference of the other downlink physical channels in the same cell, and the channel used for transmitting the pilot signal. The P-CCPCH is the channel for transmitting the broadcasting information.

Next, the timing relationship of channels will be described with reference to FIG. 1.

As illustrated, one frame (10 ms) is formed based on 15 slots in each channel. As described previously, since the CPICH is used as a reference channel, the top of frames of the P-CCPCH and HS-SCCH channels are matched with the top of frame of the CPICH channel. Here, the top of frame of the HS-PDSCH channel is delayed by two slots from the HS-SCCH channel. This may be done to realize demodulation of the HS-PDSCH channel using the demodulating method that corresponds to the received modulation type after the mobile station has received the modulation information via the HS-SCCH channel. Moreover, the HS-SCCH and HS-PDSCH channels may form one sub-frame with three slots.

The HS-DPCCH channel is not synchronized with the CPICH channel but this channel is provided for the uplink direction and is based on the timing generated in the mobile station.

The channel format of the HSDPA channel has been briefly described above. Next, the processes up to transmission of the transmitting data via the HS-PDSCH channel will be described with reference to the block diagram.

"Structure of Base Station"

Figure 2:
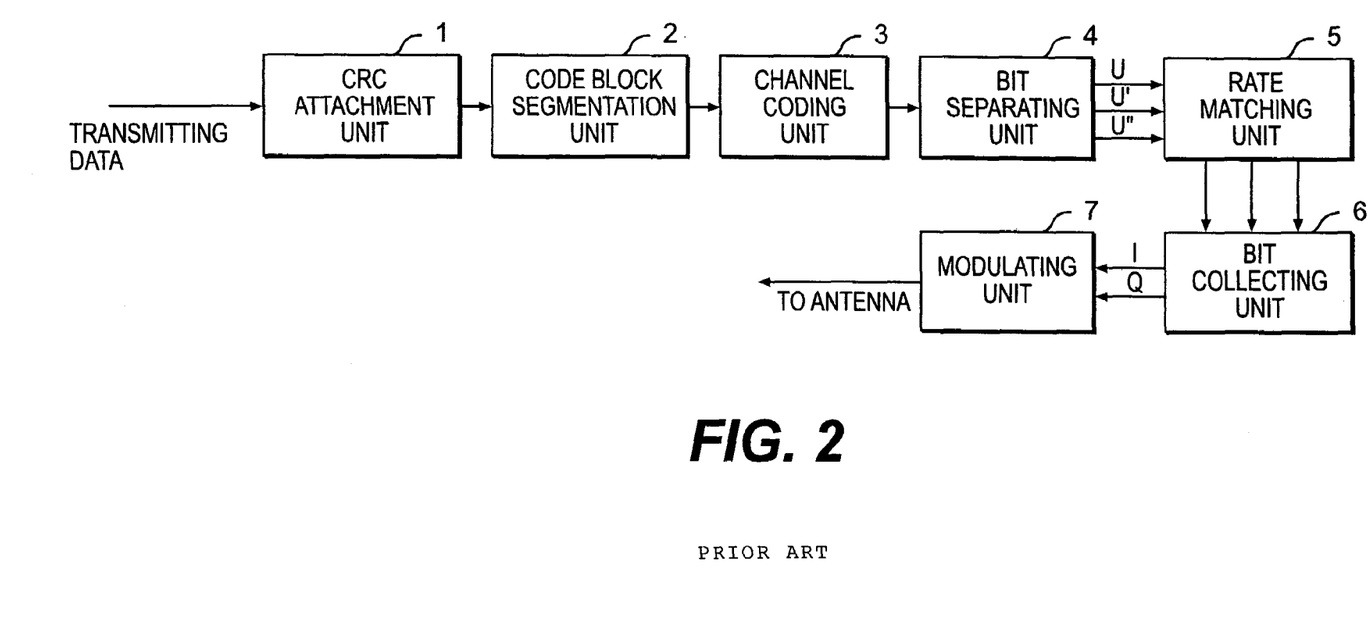
FIG. 2 is a diagram illustrating one embodiment of a structure of a base station supporting the HSDPA channel.

FIG. 2 illustrates a structure of a base station supporting the HSDPA channel.

In FIG. 2, the reference numeral 1 designates a CRC attachment unit; 2, a code block segmentation unit; 3, a channel coding unit; 4, a bit separating unit; 5, a rate matching unit; 6, a bit collecting unit; 7, a modulating unit.

Next, operations of each block will be described.

The transmitted data transmitted via the HS-PDSCH channel (data accommodated within one sub-frame of the HS-PDSCH channel in FIG. 1) is first subjected to the CRC arithmetic process in the CRC attachment unit 1 and the result of the arithmetic operation is added to the last part of the transmitting data. The transmitting data to which the result of CRC arithmetic operation is added may then be inputted to the code block segmentation unit 2 and is then segmented into a plurality of blocks. This process is required to shorten the data length in unit of the error correction coding, considering the load of decoding process in the receiving side. When the data length exceeds the predetermined length, the code block is equally segmented into a plurality of blocks. An integer 2 or larger may be selected as the number of segmentations but the number of segmentations 2 may be selected to simplify the description. If the data length is rather short, segmentation of the block may be unnecessary.

The segmented and transmitted data are respectively processed as the object data of the individual error correction encoding process in the channel coding unit 3. In other words, the error correction encoding process is executed for the segmented first block and second block. As an example of the channel encoding process, a turbo encoding process may be used.

Here, the turbo encoding process will be described briefly. In an exemplary turbo encoding process, when the data is defined as U, the data U' obtained by the convolutional encoding of the data U, and the data U" obtained by the convolutional encoding of the data U after the interleave (re-arrangement) process of the data U may be outputted. Here, the data may be referred to as the systematic bits and may be understood, in the turbo decoding process, as the data used in two element decoders and the data having a higher degree of importance because the application frequency is high. On the other hand, the data U' and U" are parity bits. These bits are data used in one of the two element decoders and have a degree of importance that is lower than that of the data U because the application frequency is low.

Namely, it can be said that since the systematic bits have a higher degree of importance than that of the parity bits, and the systematic bits are received with greater accuracy, the more accurate decoding result can be obtained with the turbo decoder.

The systematic bits and parity bits that are generated as described above may be inputted as the serial data to the bit separating unit 4. The bit separating unit 4 separates the input serial data into the data U, U', and U" of three systems, and then outputs this data as parallel data.

The rate matching unit 5 preferably performs the puncture process for deleting the bits with the predetermined algorithm and also executes the repetition process to repeat the bits in order to store the data within the sub-frame formed of three slots of the HS-PDSCH channel.

As described above, the bits having completed the bit adaptation process to the sub-frame are then inputted in parallel to the bit collecting unit 6.

The bit collecting unit 6 preferably generates bit sequences of four bits indicating each signal point, for example, of 16-level QAM modulation based on the input data and then outputs these bit sequences. At the time of generation of bit sequences, the systematic bits are preferably arranged, for the first transmission, in the side of upper bits in which an error is not easily generated.

The modulating unit 7 outputs the signal of the 16-level QAM modulation to provide the amplitude and phase corresponding to the signal points indicated with the input bit sequences and then provides the signal to the side of the antenna (not illustrated) after conversion to the radio frequency through the frequency conversion.

"Detailed Description of the Rate Matching Unit 5"

Figure 3:
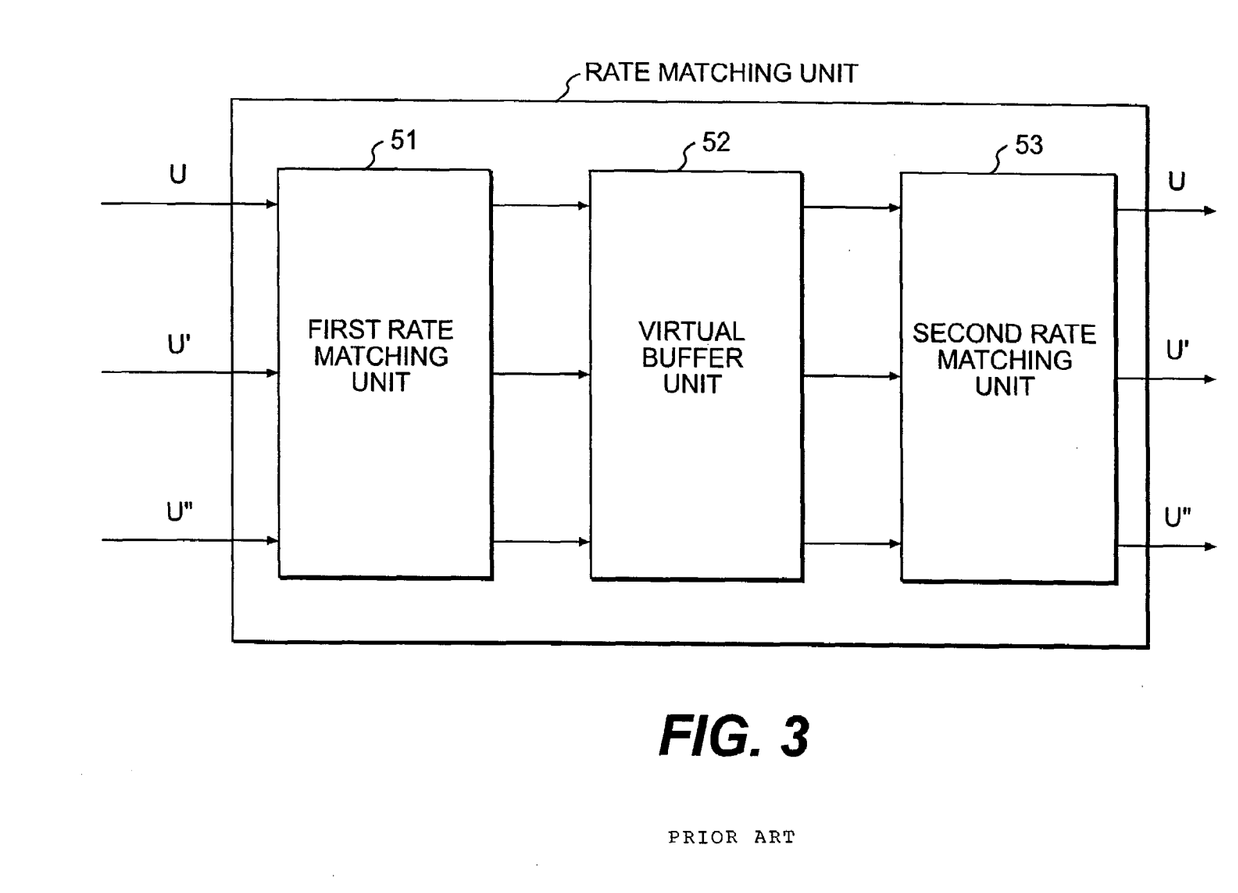
FIG. 3 is a diagram illustrating one embodiment of a rate matching unit 5.

FIG. 3 illustrates one embodiment of the rate matching unit 5. The rate matching unit 5 comprises, as illustrated, a first rate matching unit 51, a virtual buffer 52, and a second rate matching unit 53.

The first rate matching unit 51 executes the rate matching process (puncture process) to the first parity bits (U') and second parity bits (U") separated in the bit separating unit 4. This process may be executed, considering the capability of the mobile station in the receiving side described below (capacity of memory or the like to store the data obtained by combining the received data and re-transmitted data), in order to keep the maximum amount of data which can be transmitted including the re-transmission under the capability of the mobile station. Accordingly, bits are deleted on the basis of a predetermined rule.

The virtual buffer unit 52 may be provided to store the systematic bits. The first and second parity bits may have completed the puncture process (deletion of bits) in accordance with the capability of the mobile station.

The second rate matching unit 53 performs the puncture process and the repetition process. The puncture process deletes the bits based on the predetermined rule, and the repetition process repeats the bits for the data read from the virtual buffer in order to store the data within the sub-frame formed from the three slots of the HS-PDSCH channel.

The structure and operations of the rate matching unit 5 are described above and one embodiment of data due to the process performed by the rate matching unit 5 will be described with reference to FIG. 4.

Figure 4:
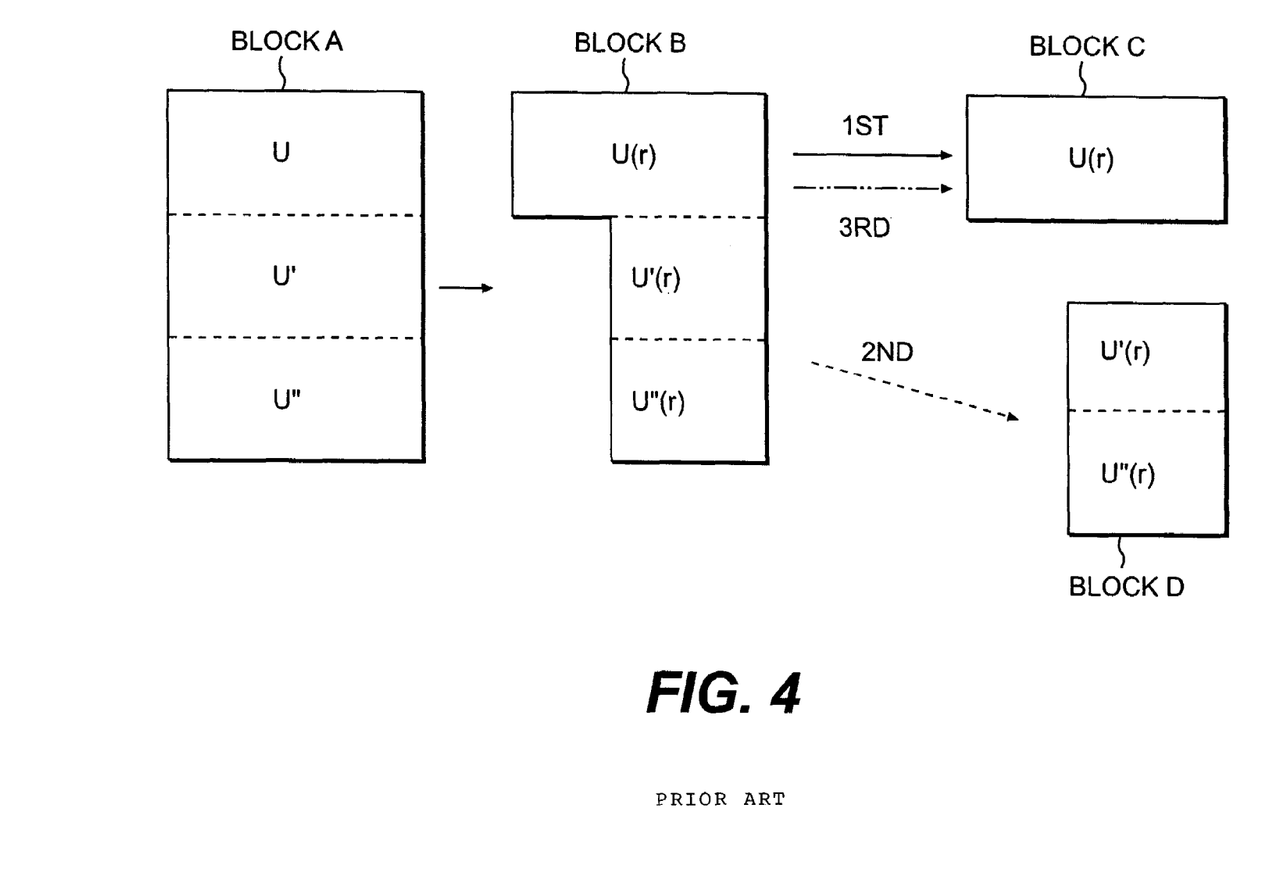
FIG. 4 is a diagram illustrating one embodiment of changes of data in the rate matching unit 5.

The block A in FIG. 4 illustrates the systematic bits (U), first parity bits (U'), and second parity bits (U") inputted to the first rate matching unit 51.

The first rate matching process unit 51 executes the puncture process to the block A to attain the predetermined amount of data determined in accordance with the capability of the mobile station and then provides an output. Namely, the bits are deleted to result in the amount of data indicated in the block B considering the capability of the mobile station.

Various methods may be assumed for deletion of bits. For example, the block B illustrated in FIG. 4 may be formed by not applying the puncture process to the systematic bits. These systematic bits are important, and the puncture process is applied to the first and second parity bits (indicated as U' (r) and U" (r) in order to show execution of the puncture process as the rate matching process). In FIG. 4, the left half bits are deleted but it is preferable to delete the bits at the positions which a dispersed to a certain degree. For example, the even number bits or odd number bits are deleted.

The second rate matching unit 53 executes the rate matching process to store the data within the sub-frame on the basis of the data block B puncture-processed in the first rate matching unit 51 and then outputs the transmitting data.

For example, with the first transmission, the systematic bits U are outputted as the block C after execution of the puncture process. With the second transmission (first re-transmission), the first parity bits U' (r) and the second parity bit U" (r) are outputted as block D after execution of the puncture process. The number of times that the re-transmission may occur may be a predetermined number equal to 1 or larger. However, when the third transmission is assumed to be the last re-transmission which includes the first transmission, the block C obtained by the puncture process is transmitted again, for example, to the block B in the third transmission (second re-transmission).

The items regarding the HSDPA channel are disclosed, for example, in the non-patent document "3G TS 25. 212 ($3^{rd}$ Generation Partnership Project: Technical Specification Group Radio Access Network; Multiplexing and channel coding (FDD))".

According to the background technology described above, the amount of data transmitted to a mobile station is previously limited (limited to the block B), with the (first) rate matching, to the value below the capability of the receiving apparatus (capacity of memory or the like to store the data obtained by combining the received data and re-transmitted data). Thus, the receiving apparatus does not receive data exceeding the capability (capacity of memory) and is capable of executing the error correction decoding process by completely utilizing the first receiving data and the re-transmitted receiving data.

However, such limitation will close the way of utilization of the data part exceeding the capacity of memory of the receiving apparatus. This will result in the disadvantage that the sufficient capability of the error correction decoding process cannot be ensured.

Elimination of such limitation may be achieved by increasing the capacity of the memory of the receiving apparatus. However, when reduction in the size of the mobile station is alienated due to the increase in capacity of memory and particularly when soft-determination data is used for the error correction decoding process, the amount of data increases drastically. Therefore, elimination of the limitation cannot be employed directly.

SUMMARY OF THE INVENTION

In one embodiment, the present invention is capable of effectively executing the error correction decoding process while increasing the amount of data which must be stored in the receiving apparatus in a controlled manner.

In one embodiment, the present invention comprises a transmitting apparatus for transmitting data to a receiving apparatus which executes error correction decoding processes using the received data and the re-transmitted data. The apparatus includes: a transmitting data generating unit for generating a first set of transmitted data by executing a rate matching process to a first part of the error correction encoded data and generating a second set of transmitted data including at least the data not included to the first part by executing the rate matching process to the entire part or a second part of the error correction encoded data. Also included is a transmitting unit for re-transmitting the second set of transmitted data after transmission of the first set of transmitted data.

Preferably, the transmission of the second set of transmitted data is the last re-transmission among the continuous re-transmissions to be executed.

It may be desirable for the second set of transmitted data to include a data part common to the first set of transmitted data. Preferably, the transmission of the second set of transmitted data is not the last re-transmission among the continuous re-transmissions to be executed.

In one embodiment, the first data part may be attained by executing the rate matching process to the error correction encoded data.

Preferably, the first part is the data portion obtained by executing the rate matching process in a first pattern to the error correction encoded data. The second part is the data portion obtained by executing the rate matching process in a second pattern to the error correction encoded data.

In one embodiment, a transmitting apparatus for transmitting data to a receiving apparatus which executes the error correction decoding process by using a combined data of the received data and the re-transmitted data may also be included.

The apparatus comprises a transmitting data generating unit for generating a transmitting data for a particular re-transmission identified by a receiving apparatus. This occurs when the amount of data obtained by combining the transmitting data and the data transmitted already exceeds the capacity of a storing unit provided in the receiving apparatus for storing a combined received data. A transmitting unit for transmitting the transmitting data as the particular re-transmission may also be included.

Preferably, the transmitting apparatus further comprises a control unit making a determination on the basis of any of, the number of times of transmission, the number of times of continuous reception of the NACK signal, and the passage of time from the first transmission.

Preferably, the transmitting apparatus further comprises a notifying unit capable of notifying the particular re-transmission to the receiving apparatus.

Preferably, the transmitting apparatus is a base station used in the mobile communication system for supporting the HSDPA, while such notification is executed via the HS-SCCH.

In one embodiment, the present invention comprises a transmitting apparatus that includes a transmitting unit for transmitting data to a receiving apparatus which executes the error correction decoding process by using data obtained by combining previously received data and re-transmitted data. Also included is a notifying unit for notifying the receiving apparatus of the last re-transmission among a series of re-transmissions to be executed by said transmitting unit.

In another embodiment, the present invention comprises a receiving apparatus for executing the error correction decoding process by using data obtained by combining a received data and a re-transmitted data. The receiving unit also includes a storage unit for storing the first received data, and a controlling unit. The controlling unit combines the data read from the storage unit with received data transmitted in the re-transmission and stores the combined data to the storage unit in the not particular re-transmission. The controlling unit combines the data read from the storage unit with the received data transmitted and not stores the combined data in the particular re-transmission and controlling.

In another embodiment, the present invention comprises a receiving apparatus that executes an error correction decoding process by using data obtained by combining received data and re-transmitted data. The apparatus includes a storage unit for storing the first received data, and a control means to execute the control for the received data in the re-transmission. The control means combines the data read from the storage unit with the received data and stores the combined data in the storage unit in the not particular re-transmission. However, the received data in the particular re-transmission, to combine the data read from the storage means with the received data, to store the data part corresponding to the data stored by the storage unit among the combined data to the storage unit but not to store the data part not corresponding to the data stored by the storage unit to the storage unit.

Preferably, the receiving apparatus further comprises a re-transmission detecting unit for determining a re-transmission based on any of, the contents notified from a base station, the number of times of transmission of the NACK signal, the number of times of reception, and the passage of time from the first reception.

Preferably, the receiving apparatus is a mobile station used in the mobile communication system supporting the HSDPA. Whether the transmission is the particular re-transmission or not is determined by a particular re-transmission detecting unit for determining the particular re-transmission with the information notified from a base station via the HS-SCCH.

In one embodiment, the present invention comprises a receiving apparatus for executing the error correction decoding process by using data by combining the received data stored in a storage unit and the re-transmitted data. The apparatus comprises a determining unit for determining whether the re-transmission is the last re-transmission or not, and a control unit. The control unit controls the storage unit to store the combined data of the data re-transmitted the determining unit determines that the re-transmission is not the last re-transmission and controls the storage unit not to store the combined data of the data re-transmitted by the last re-transmission when the determining unit determines the re-transmission is the last re-transmission.

In another embodiment, the present invention comprises a re-transmission control method in which if a mobile station having received the data transmitted from a base station has detected a receiving error, the mobile station transmits a re-transmission request to the base station and the base station executes the re-transmission in accordance with the re-transmission request. The method includes the base station transmitting, at the time of the particular re-transmission, the transmitting data wherein an amount of a data obtained by combining the transmitting data and data which have already been transmitted exceeds the capacity of the storage unit of the mobile station for storing the combined data. While the mobile station executes the error correction decoding process through the combining between the receiving data of the particular re-transmission and the received data stored in the storage unit but does not store the combined data to the storage unit.

In another embodiment, the present invention comprises a data transmission method in a CDMA mobile communication system introducing the H-ARQ.

For a first transmission, a first rate matching unit executes the rate matching process in a first pattern to output a first set of data, while a second rate matching process unit executes the rate matching process to the first set of data to output a second set of data. For the particular re-transmission, the first rate matching unit executes the rate matching process in a second pattern to output a third set of data including the data not included in the first set of data, while the second rate matching process unit executes the rate matching process to the third set of data to output a fourth set of data including the data not included in the first set of data.

DETAILED DESCRIPTION OF THE PREFERRED EMBODIMENTS

[a] Description of an Examplary Embodiment

Figure 5:
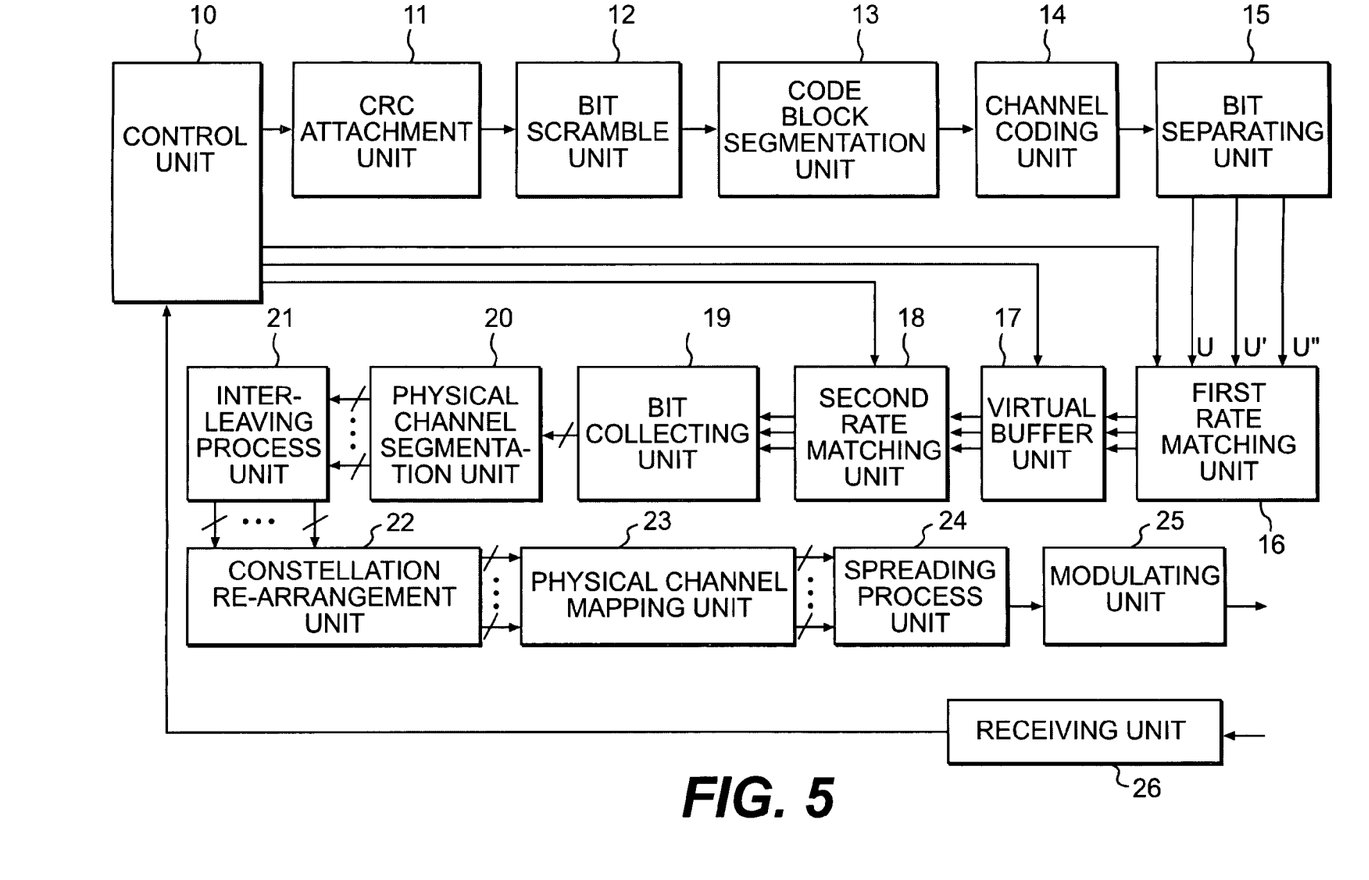
FIG. 5 is a diagram illustrating one embodiment of a transmitting apparatus according to the present invention.

FIG. 5 is a diagram illustrating one embodiment of a transmitting apparatus of the present invention.

As an example of the transmitting apparatus, one embodiment of a radio base station in the W-CDMA communication system corresponding to the HSDPA described previously will be described. This exemplary transmitting apparatus can also be adapted to the transmitting apparatus of the other communication systems known to those skilled in the art.

In the FIG. 5 embodiment, the reference numeral 10 designates a control unit which sequentially outputs the transmitting data (data for transmission within one sub-frame) to be transmitted via the HS-PDSCH channel and controls each unit (11 to 26 or the like). Since the HS-PDSCH channel is the shared channel, the sequentially outputted transmitting data may be permitted to be transmitted to different mobile stations.

The reference numeral 11 designates a CRC attachment unit for executing the CRC arithmetic operation to the sequentially inputted transmitting data (data transmitted within the same radio frame) and adding the result of CRC arithmetic operation to the last part of the transmitting data. Numeral 12 designates a bit scrambling unit which forms the random transmitting data by scrambling, in unit of bit, the transmitting data to which the result of the CRC arithmetic operation is added.

Numeral 13 designates an exemplary code block segmentation unit which segments (into the two blocks) the input transmitting data having completed bit scrambling if this transmitting data exceeds the predetermined data length in view of preventing an increase in the amount of arithmetic operations of the decoder in the receiving side because the data as the decoding object becomes too long in the channel encoding to be executed next. In FIG. 5, the input data length exceeds the predetermined data length. In one embodiment, the data segmented to the two blocks (segmented to the first data block and second data block) are outputted. The number of segmentations other than 2 may naturally be selected and moreover the transmitting data can also be segmented in different data lengths in place of the segmentation in equal data length.

Numeral 14 designates an exemplary channel coding unit for individually executing the error correction encoding to the segmented data. As the channel coding unit 14, the turbo encoder described above is preferably used here.

As described previously, the first output includes, for the first block, the important systematic bits (U) which is identical to the data as the encoding object, the first parity bits (U') obtained by convolutional encoding of the systematic bits (U) and the second parity bits (U") obtained by the similar convolutional encoding of the systematic bits after the interleave process. In a substantially similar manner, the second output includes, for the second block, the systematic bits (U), first parity bits (U') and second parity bits (U").

Numeral 15 designates a bit separation unit for separately outputting the systematic bits (U) of the first block and second block, the first parity bits (U'), and the second parity bits (U") from the channel coding unit 14 (turbo coder). This process may also be adapted to the second block. Accordingly, only the output corresponding to the first block is illustrated.

Numeral 16 designates a first rate matching unit. The matching unit executes the rate matching process, such as the puncture process (thinning) to the input data, to provide the input data (all data of the segmented blocks when the data is segmented to a plurality of blocks) to be stored in the predetermined region of the virtual buffer unit 17 of the subsequent stages.

The first rate matching unit 16 executes the rate matching in the first pattern when the transmission is either the first transmission, or not the particular re-transmission. In this case, the amount of data after the rate matching is preferably set to the capacity which may be equal to or less than that of the memory. This may be done to realize the H-ARQ of the mobile station to receive the data. For example, the control unit 10 of the base station recognizes the capacity of the memory for H-ARQ of the mobile station on the basis of the information about the received capability. It then notifies and sets the recognized capacity to the first rate matching unit and virtual buffer unit 17.

Moreover, the first rate matching unit 16 is also instructed, by the control unit 10, to change the rate matching pattern (puncture pattern) to the second pattern at the time of the particular re-transmission.

As the particular re-transmission time, the last re-transmission time or the other re-transmission time may be considered. In any case, the mobile station can preferably recognize the data, when this data is received, as the data transmitted by the particular re-transmission.

Examples of the method with which the base station can recognize the particular re-transmission are listed below.

EXAMPLE 1

The base station may be capable of recognizing the particular re-transmission when the receiving unit 26 receives the NACK signal. The NACK signal indicates no-acknowledgment of reception from the mobile station about the transmitting data transmitted from the base station and the control unit 10 detects that the number of times of continuous reception of the NACK signal has reached the predetermined value M. (M is preferably a natural number).

EXAMPLE 2

The base station may be capable of recognizing the particular re-transmission when the control unit 10 detects the necessity of the re-transmission with which the number of times of transmission including the first transmission reaches the predetermined value N (N: natural number). This preferably occurs at the time of execution of the re-transmission control based on the NACK signal which indicates no-acknowledgment of reception from the mobile station about the transmitting data transmitted from the base station.

EXAMPLE 3

The base station can recognize the particular re-transmission when the control unit 10 detects that the predetermined time T has passed from the first transmission by the base station and the re-transmission of the data about the error correction encoding data equal to that in the first transmission is required.

In one embodiment, the mobile station may be capable of recognizing the particular re-transmission and may be capable of recognizing, in the case of the example 1, the re-transmission in accordance with the NACK signal. This preferably occurs when the NACK signal has reached the predetermined value M as the particular re-transmission by counting the number of times of the continuous transmissions of the NACK signal. Moreover, in the case of the example 2, the mobile station can also recognize, for example, the N-th reception which has reached the predetermined value N (only in the case regarding the same error correction encoded data) by counting the number of times of reception N. In addition, in the example 3, the mobile station can recognize, for example, that the predetermined time T has passed from the first reception and reception of the data by the re-transmission regarding the error correction encoded data which is substantially similar to the data of the first reception is caused by the particular re-transmission.

Here, the predetermined values M, N, and T may be previously stored in the mobile station and may also be notified from the base station.

Moreover, whether the transmitting data to the mobile station from the base station is the data in the particular re-transmission or not (whether the re-transmission is the last re-transmission or not) can also be notified in direct with a certain method, regardless to the examples 1 and 2. For example the base station notifies to the mobile station via the HS-SCCH channel or the like by transmitting, to the mobile station, a notifying signal which indicates the data transmitted via the HS-PDSCH channel is the particular re-transmission or not.

As described above, the mobile station may be capable of recognizing the particular re-transmission with any method described above.

Numeral 17 designates an exemplary virtual buffer unit which is preferably controlled by the control unit 10 to set a region corresponding to the receiving process capability of the mobile station as the transmission object and stores the data completing the rate matching process by the first rate matching unit 16. During the particular re-transmission (including the last re-transmission), a pattern of the rate matching (puncture) changes and therefore data to be stored also changes. In one embodiment, therefore, the region which can store the data punctured with the changed pattern may be set by the control unit 10.

Numeral 18 designates a second exemplary rate matching unit for adjusting the data to the data length which may be stored by the control unit 10 in the designated one sub-frame. The data length of input data is adjusted to provide the designated data length by executing, for example, the puncture process (thinning) and repetition process (repeating).

In one embodiment of the HS-PDSCH system, the parameters such as modulation method, spreading factor (SF), number of codes (number of channels) are variable. Therefore, each number of bits stored within respective sub-frame is variable even when the sub-frames have the equal length. The control unit 10 notifies the number of bits in accordance with the parameters to the second rate matching unit 18 as the data length which can be stored in one sub-frame. Moreover, the control unit 10 notifies the changed pattern to the second rate matching unit 18 when the pattern of rate matching is changed, for example, for execution of each re-transmission.

Numeral 19 designates an exemplary bit collection unit for arranging the data from the second rate matching unit 19 into a plurality of bit sequences. Namely, a plurality of bit sequences for indicating the signal points on the respective phase planes may be outputted by arranging both first block data and second block data with the predetermined bit arrangement method. In this embodiment, each bit sequence is formed with four bits because the 16-level QAM modulation system is employed. Of course, the other multi-level modulation system (for example, 8-phase PSK or the like) may also be introduced.

Numeral 20 designates an exemplary physical channel segmentation unit which can output the segmented bit sequences to the systems in the same number as the number of spreading codes (number of codes) notified from the control unit 10. Namely, this unit may provide an output by sequentially sharing the input bit sequences to the systems 1 to N, when the number of codes in the transmitting parameters is N.

Numeral 21 designates an exemplary interleaving unit for outputting the bit sequences of the N systems by executing the interleaving process to such bit sequences.

Numeral 22 designates an exemplary constellation re-arrangement unit for 16 QAM which may execute the re-arrangement of the bits within the bit sequences for each input bit sequence. For example, it is also possible that at the time of the first transmission, each input bit is outputted directly without any process, and during the re-transmission in the H-ARQ described above, re-arrangement of bits can also be executed. The re-arrangement of bits means, for example, the process to replace the upper bits with the lower bits. Accordingly, it is preferable to perform the replacement of the bits depending on the equal rule for a plurality of bit sequences. The bit sequences in the re-transmission may also be outputted substantially directly without any process.

Numeral 23 designates an exemplary physical channel mapping unit for sharing the bit sequences of the N systems in the subsequent stage into the corresponding spreading unit of the spreading process unit 24 in the subsequent stage.

Numeral 24 designates an exemplary spreading process unit which is provided with a plurality of spreading units to respectively output the corresponding I, Q voltages on the basis of each bit sequence of the N systems and also provide an output by executing the spreading process using different spreading codes.

Numeral 25 designates an exemplary modulating unit for combining (adding) the signals spread by the spreading process unit 24, executing, on the basis of the combined signals, the amplitude phase modulation such as 16-level QAM modulation and then transmitting the signal from the antenna as the radio signal through frequency conversion.

Numeral 26 designates an exemplary receiving unit which receives the signal from the mobile station via the HS-DPCCH and then gives the ACK and NACK signals and the CQI or the like to the control unit 10.

Names and operations of respective units are described above. From the above description, it may be understood that the rate matching pattern is changed particularly when the first rate matching unit 16 executes the particular re-transmission. Further details of this process will then be described below with reference to FIG. 6.

"Change in Data by Rate Matching Process"

Figure 6:
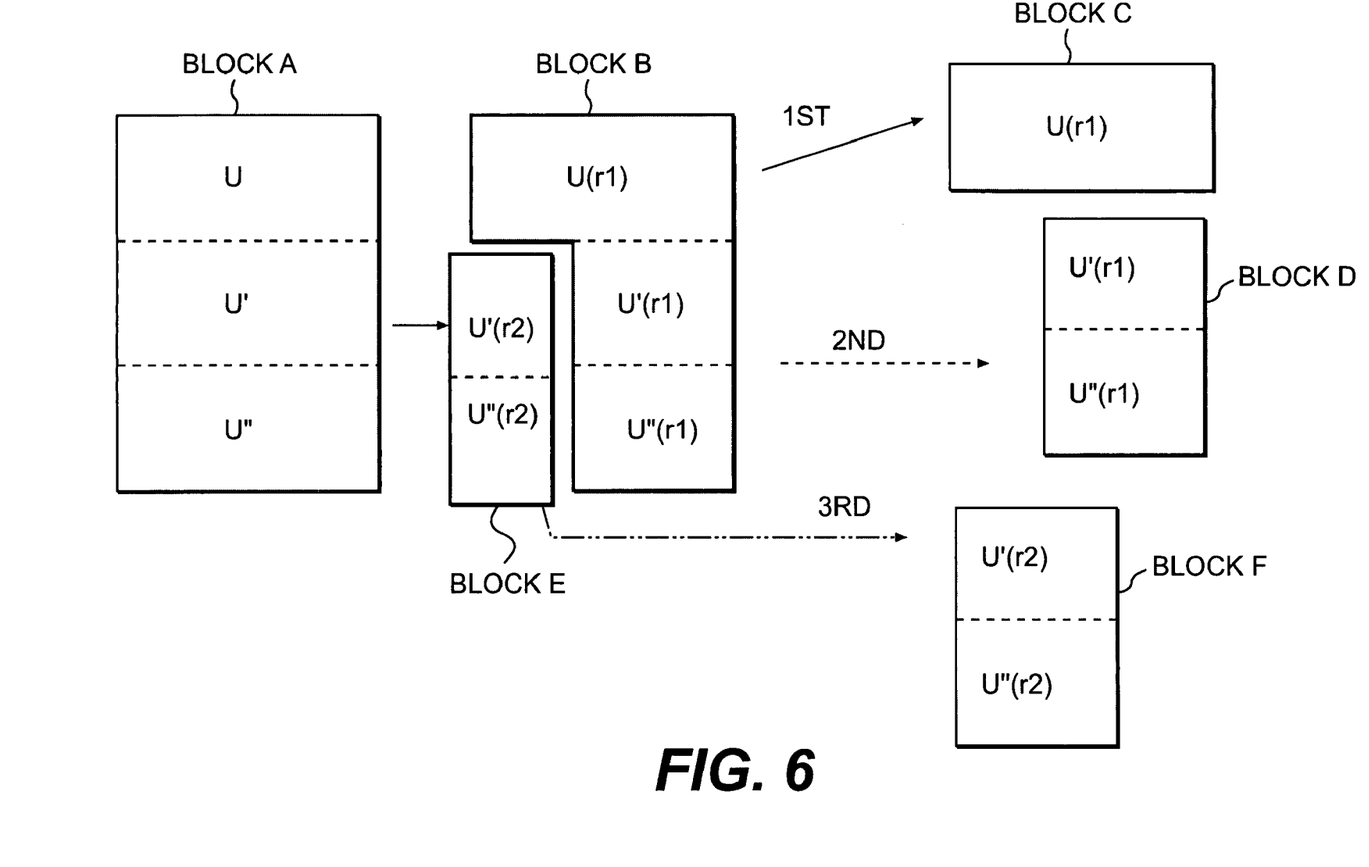
FIG. 6 is a diagram illustrating changes of data by the rate matching process according to one embodiment of the present invention.

The block A in FIG. 6 indicates the systematic bits (U), first parity bits (U'), and second parity bits (U") to be inputted to the first rate matching unit 16. The first rate matching unit 16 executes, when the transmission is not the particular re-transmission, the rate matching process (puncture process) in the first pattern to the data of block A. This may be done to provide the predetermined amount of data determined corresponding to the capability (memory 31 for H-RAQ) of the mobile station which is notified by the control unit 10, and to output the data as the block B which is the first part. In this embodiment, the amount of data of the block B may be matched with the capacity of the memory 31 but it is also possible that the amount of data is not matched with such capacity.

As the first pattern, various patterns such as the pattern for leaving the systematic bits with priority or the pattern for leaving the parity bits with priority may be considered. In block B, for example, the systematic bits are never subjected to the puncture process because these bits are important bits and are then outputted substantially directly. However, regarding the first and second parity bits, the predetermined bits thereof are deleted with the puncture process (such bits are indicated as U' (r1) and U" (r1) in order to indicate execution of the first puncture process). In the figure, the right half bits are deleted but it is preferable to delete the bits in the positions which are spread to a certain degree. For example, the even number bits or odd number bits are deleted.

Moreover, the first rate matching processing unit 16 executes, at the time of executing the particular re-transmission, the rate matching process in the second pattern to the data of block A and provides the output as the block E (expressed as U' (r2) and U'" (r2) in order to indicate that the puncture process in the second pattern has been executed). The second pattern is preferably different from the first pattern and includes at least the data not included in the first pattern.

Moreover, the particular re-transmission time is desirably defined as the last re-transmission time to execute the re-transmission but may also be considered as any re-transmission time (not always defined as the last re-transmission) identified with the mobile station.

For the assumed last re-transmission time, the mobile station is capable of executing the error correction decoding. This may be done by combining the data stored before receiving the last re-transmission in the memory 31 and the data received by the last re-transmission, because, when the re-transmission is no longer executed, it is no longer required to store the data to the memory 31 as the data to be combined as the preparation for further re-transmission of the combined data.

Moreover, when the mobile station is assumed to be in any re-transmission time which can be identified as the particular re-transmission (not always considered as the last re-transmission time), the mobile station executes the error correction decoding by combining the data which has already been received and stored in the memory 31 and the data received during this re-transmission. The mobile station also executes the particular process to store a part of the data after the combining process in the memory 31 when the part of data includes data regarding the same bits as the data which is already stored in the memory 31. This process enables to use the received data transmitted by the particular re-transmission for a next re-transmission.

The rate matching process in the first rate matching unit 16 has been described above and it should be noted that the data after the rate matching process in the second pattern includes the bits which are included in the error correction coded block A but not in the data after the rate matching process in the first pattern 1. Specially in one embodiment, since there is no duplicated part in the data after the rate matching process in the second pattern and the data after the rate matching process in the first pattern and the block E corresponds to a complementary aggregation of the block B when the block A is assumed as the entire block, the data after the rate matching process in the second pattern includes, irrespective of the rate matching pattern in the second rate matching unit, the bits which are included in the error correction encoded block A but not in the data after the rate matching process in the first pattern.

However, it should be noted that the present invention is never restricted to the example described above by setting of the rate matching pattern in the second rate matching unit 18 described later.

In one embodiment, block 1 may be obtained by puncturing the block A in the first pattern and block 2 may be obtained by punching the block A in the second pattern. Each block may include at least different data portions, at least a part of which can be left after the second rate matching unit 18 has executed the rate matching process of the block 2 and the second rate matching unit 18 can execute the rate matching in the pattern which enables such leaving of a part of the data part.

In this embodiment, it may be possible to avoid the situation in which all data received by the mobile station during the particular re-transmission time can't be used (combining with next re-transmitted data is impossible), even when the particular re-transmission is not the last re-transmission and the next re-transmission is therefore executed, by including the data included in the data after the puncturing in the first pattern to the data after the rate matching process for block 2.

In one embodiment, the second rate matching unit 18 executes the rate matching process in the pattern designated by the control unit 10 to store the data within the sub-frame. The storage is done on the basis of the data block B as the first part punctured in the first rate matching unit 16 and the data block E as the second part. The matching unit 18 then outputs the transmitting data as the blocks C, D, and F. For example, when the particular re-transmission is the third transmission (second re-transmission), the second rate matching process unit 18 outputs, at the time of the first transmission, block C. This may be done by executing the rate matching process on the basis of the data included in block B and also outputs block D, at the time of the next transmission, on the basis of the data included in block B. At the time of the last re-transmission as the third re-transmission, the second rate matching process unit 18 executes the rate matching process on the basis of the data included in the block E to output the block F.

Flow of the rate matching process is described Above. In one embodiment, the transmitting apparatus (the base station) obtains block F for the particular re-transmission (for example third transmission) and transmits block F to the receiving apparatus (the mobile station). Here the receiving apparatus can identify the particular re-transmission and if the receiving apparatus combines block F with the data which the receiving apparatus already received as the data (block C as the first transmission data and block D as the second transmission data) regarding the same error correction encoded data (block A), then the amount of the combined data (block C+block D+block F) exceeds the capacity of memorizing unit (for example memory 31).

An example of the rate matching process in the two stages executed by the first rate matching unit 16 and the second rate matching unit 18 has been described above, but the data which is identical to the data obtained by the rate matching in the two stages can also be generated with the rate matching of only one stage. In other words, the rate matching process is executed to the block A in the pattern which can generate substantially directly the block C, block D, and block F. In one embodiment, it is block A may be attained by combining blocks C, D, and F and block A may exceed the size of block B as the capacity of the memory 31.

Next, one embodiment of the receiving apparatus of the present invention will be described.

"Description of Receiving Apparatus (Mobile Station)"

Figure 7:
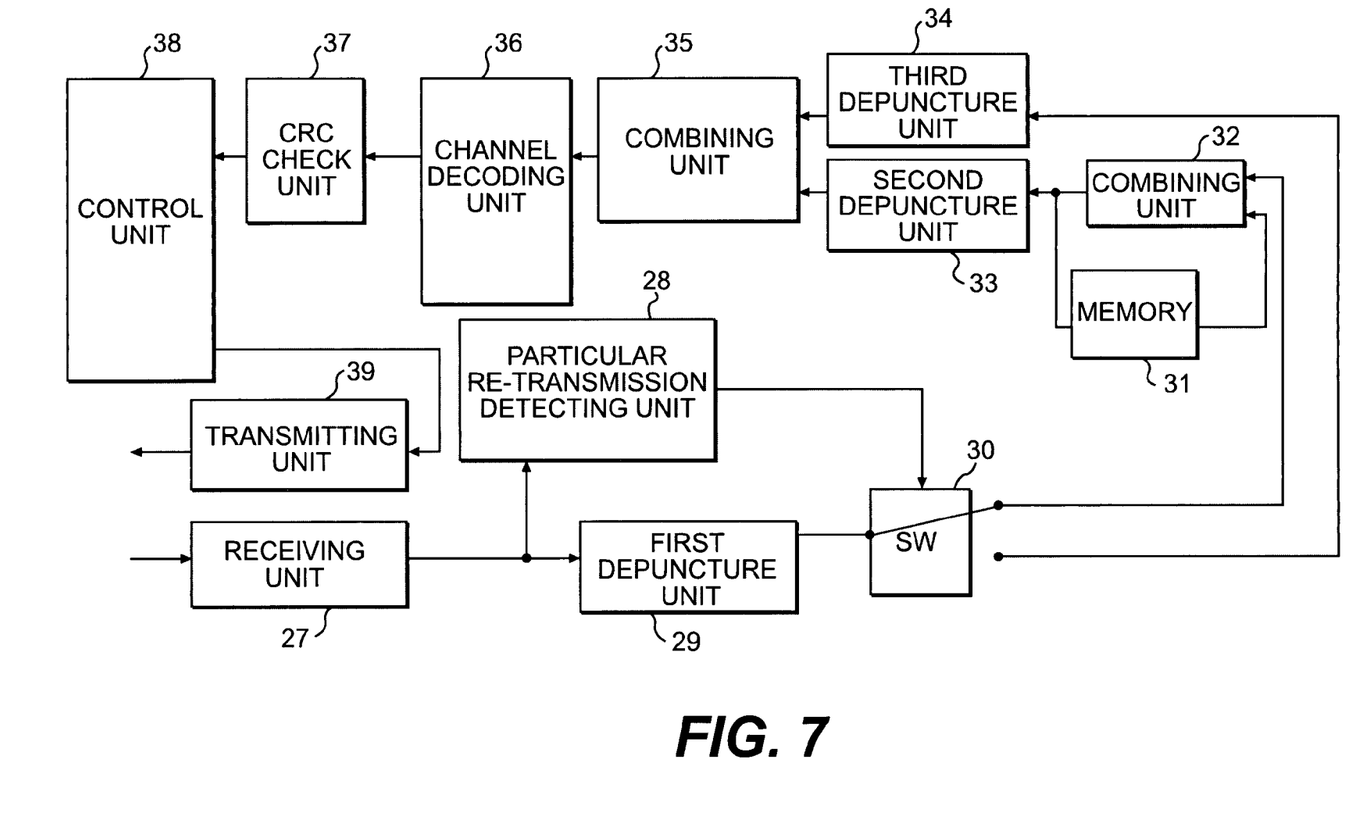
FIG. 7 is a diagram illustrating one embodiment of a receiving apparatus according to the present invention.

FIG. 7 is a diagram illustrating one embodiment of the receiving apparatus of the present invention.

As an example of the receiving apparatus, a receiving apparatus (mobile station) of the W-CDMA communication system corresponding to the HSDPA described previously will be described. This receiving apparatus can also be adapted to the receiving apparatus in the other communication systems.

In FIG. 7, numeral 27 designates a receiving unit which outputs the receiving signal by executing the orthogonal detection and despread process, or the like, to the receiving signal. In view of utilizing the soft-determination information in a channel decoding unit 36 described later, an output of the receiving unit 27 also includes the soft-determination information.

Numeral 28 designates one embodiment of a particular re-transmission detecting unit which determines whether the transmission is the particular re-transmission or not. This may be done by receiving a notice indicating the transmission is the particular re-transmission or not via the HS-SCCH, or the like, before the reception of the data via the HS-PDSCH and then controls a SW 30 in accordance with the result of determination.

In another embodiment, the particular re-transmission detecting unit 28 counts up the number of times of continuous transmission of the NACK signal and this unit detects that the counted value has reached the predetermined value M. In this embodiment, the particular re-transmission detecting unit 28 counts up the number of times of reception of data via the HS-PDSCH channel (number of times of transmission regarding the same error correction encoded data including the first transmission and re-transmission) and also detects that the counted value has reached the predetermined value N, and the method in which the particular re-transmission detecting unit 28 detects, with a timer, that the predetermined time T has passed from the reception of the new data.

Numeral 29 designates a first exemplary depuncture unit which inserts the information which means the zero degree of likeliness to the bit position deleted by the puncture process corresponding to the process inverted to the process of the second rate matching unit 18. An adverse effect on the error correction decoding process in the channel decoding unit 36 can be suppressed by inserting the information which means a substantially zero degree of likeliness.

The rate matching pattern in the second rate matching unit 18 can be changed for each transmission. However, since the control unit 38 can previously recognize such pattern via the HS-SCCH channel, the control unit 38 is capable of controlling the first depuncture unit 29 to execute the depuncture process corresponding to the pattern notified from the base station for each reception of data.

Next, numeral 30 designates a switch (SW) unit. The SW unit 30 selects the side of the third depuncture unit 34 with the control of the particular re-transmission detecting unit 28 when the data is related to the particular re-transmission. Moreover, when the data is not related to the particular re-transmission, the side of a combining unit 32 is selected.

Accordingly, the data not related to the particular re-transmission are all considered as the object of combining process in the combining unit 32.

Numeral 32 designates a combining unit and numeral 31 designates a memory. The data related to the first transmission is outputted directly to the second depuncture unit 33 and is then stored in the memory 31. Meanwhile, the transmitting data of the second and subsequent transmissions which are not the particular re-transmission are combined with the data stored in the memory 31 and is then outputted to the second depuncture unit 33 and the combined data is then stored in the memory 31. For execution of the combining process, it is considered, for example, to obtain the average of the likeliness degree information. In one embodiment, when the likeliness degree is high only in the first reception but such likeliness degree is low in the subsequent receptions, the likeliness degree is lowered for that of the first transmission through the combining process.

Numeral 33 designates a second depuncture unit and numeral 34 designates a third depuncture unit. The information of zero degree of likeliness is inserted to the bit position deleted by the puncture process corresponding to the process inverted from the process of the first rate matching unit 16.

When the transmission is not the particular re-transmission, since the rate matching process is executed in the first pattern, the second depuncture unit 33 executes the depuncture process corresponding to the first pattern. When transmission is the particular re-transmission, since the rate matching process is executed in the second pattern, the third depuncture unit 34 executes the depuncture process corresponding to the second pattern.

It should also be noted that the memory 31 to store the combined data as the object of depuncture is provided in the preceding stage of the second depuncture unit 33, while such memory is not provided at the preceding stage of the third depuncture unit 34.

Numeral 35 designates an embodiment of a combining unit for combining the outputs of the second and third depuncture units 33, 34 and then provides the outputs thereof.

Numeral 36 designates an embodiment of a channel decoding unit for outputting the error-corrected data by executing the error correction decoding process such as the turbo decoding process on the basis of the output from the combining unit 35.

Numeral 37 designates an embodiment of a CRC check unit for executing the error detecting process using the CRC bits attached to the error-corrected data and then notifying the result to the control unit 38.

In one embodiment, the control unit 38 controls each unit and transmits the ACK and NACK signals by controlling the transmitting unit 39 in accordance with existence of CRC error from the CRC check unit 37. When the CRC error is not detected, the ACK signal may be transmitted and when the CRC error is generated, the NACK signal may be transmitted. Accordingly, the base station executes the re-transmission when the NACK signal is received.

In one embodiment, the memory for storing the input/output data of the third depuncture unit 35 is not provided. However, when the bit portion duplicated in the first and second patterns exists in the first rate matching unit 16, the duplicated portion should preferably be combined with the output of the memory 31 and then preferably be written to the memory 31. However, since it is required to provide a measure for the bits to be combined, the corresponding relationship should preferably be stored preferably on the basis of the first and second patterns for combining process among the corresponding bits.

Accordingly, even if a receiving error is detected when the particular data is transmitted through the particular re-transmission and moreover the next re-transmission is executed, any disadvantage that the data transmitted by the particular re-transmission cannot be re-used completely is not generated, ensuring the effective operation.

As the next re-transmission, it is considered that the first rate matching unit 16 uses the first pattern or the second pattern. However, when the first pattern is used, the mobile station executes the operation for the case where the particular re-transmission detecting unit 28 does not detect the particular re-transmission. Meanwhile, when the second pattern is used (it may be replaced with the third pattern including the bits not included in the first pattern, unlike the first and the second patterns), the mobile station executes the operation for the case where the particular re-transmission detecting unit 28 detects the particular re-transmission.

As described above, the data generated from block E, which includes the data inherently removed from the object of transmission, in the first rate matching process, caused by the capability of the mobile station (memory 31 for H-ARQ) may be transmitted to the mobile station.

In one embodiment, the receiving apparatus is not required to store the block E to the memory 31. As described previously, when the common part exists in the first part generated by the first puncture pattern and the second part generated by the second puncture pattern in regard to the same error correction encoded data, the first rate matching unit 16 can store the common part to the memory 31. Accordingly, if the particular transmission has failed, the available part preferably exists in the receiving data.

Moreover, when the particular re-transmission detecting unit 28 has detected that the transmission of data from the base station is the last re-transmission, the mobile station is eased in the load of control, namely it is no longer required to control the storage of the combined data to the memory 31, by executing the operations during the particular re-transmission described previously.

[b] Description of Another Exemplary Embodiment

Here, consideration may be taken into account for the case where the mobile station which can't use the received data exceeding the capacity of the memory 31 through the error correction decoding process.

In one embodiment, the mobile station additionally transmits the information indicating whether the information corresponds or not to the particular transmission of the base station described in the first embodiment at the time of transmitting the capability of the mobile station itself (capacity information or the like of the memory 31) when a call is originated. With this transmission, the control unit 10 of the base station executes the control for allowing the particular re-transmission, upon determination that the mobile station can provide the measure for the particular re-transmission and also executes the control for inhibiting the particular re-transmission if the mobile station cannot provide the measure for the particular re-transmission.

[c] Description of a Third Exemplary Embodiment

For the re-transmission from the base station, the data being stored in the control unit 10 is outputted again and can also be re-transmitted with the procedures described in the first embodiment. However, more preferably, the first rate matching unit 16 can preferably output the data punctured in the first pattern and the data punctured in the second pattern to the error correction coded data inputted at the time of the first transmission and also preferably store such data to the virtual buffer. In this embodiment, each region of the virtual buffer can be obtained as required.

Accordingly, when the particular transmission is not executed, the data corresponding to the first pattern may be read from the virtual buffer. Meanwhile, when the particular transmission is executed, the data corresponding to the second pattern is read from the virtual buffer and then such data may be outputted to the second rate matching unit 18 or the like in the subsequent stage. Therefore, the process in each unit 11 to 15 can be eliminated.

When it is no longer desirable to store the data for the re-transmission as described above, it should also be noted that the virtual buffer unit is not actually required to be formed with the buffer apparatus. Namely, the virtual buffer unit of the first embodiment may be eliminated and the first rate matching unit 16 and the second rate matching unit 18 can be connected with each other.

According to one embodiment of the present invention, the error correction decoding process may be executed effectively while increasing the control over the amount of data that may be stored with the receiving apparatus.

Although the present invention has been described with reference to particular embodiments, it will be understood to those skilled in the art that the invention is capable of a variety of alternative embodiments within the spirit of the appended claims.

The invention claimed is:

1. A transmitting apparatus for transmitting data to a receiving apparatus which executes error correction decoding processes using received data and re-transmitted data, comprising:
 a transmitting data generating unit configured to generate a first set of transmitting data by executing a rate matching process to a first part of error correction encoded data and generate a second set of transmitting data including at least data not included in the first part by executing a rate matching process to a entire part or a second part of the error correction encoded data, and
 a transmitting unit configured to transmit the second set of transmitting data to the receiving apparatus as a retransmission process relating to the error encoded data after transmission of the first set of transmitting data to the receiving apparatus.

2. The transmitting apparatus according to claim 1, wherein transmission of the second set of transmitting data is a last re-transmission among re-transmissions to be executed.

3. The transmitting apparatus according to claim 1, wherein the second set of transmitting data includes a data part common to the first set of transmitting data and a transmission of the second set of transmitting data is not a last re-transmission among the continuous re-transmissions to be executed.

4. The transmitting apparatus according to claim 1, wherein the first part is attained by executing a rate matching process to the error correction encoded data.

5. The transmitting apparatus according to claim 1, wherein the first part is obtained by executing a rate matching process in a first pattern to the error correction encoded data, while the second part is obtained by executing rate matching process in a second pattern to the error correction encoded data.

* * * * *